J. E. ANGER.
VEHICLE SPRING.
APPLICATION FILED JULY 20, 1910.

1,031,612.

Patented July 2, 1912.

3 SHEETS—SHEET 1.

Witnesses
Grace P. Brereton
Albert Popkins

Inventor
John E. Anger
By Sturtevant Mason
Attys

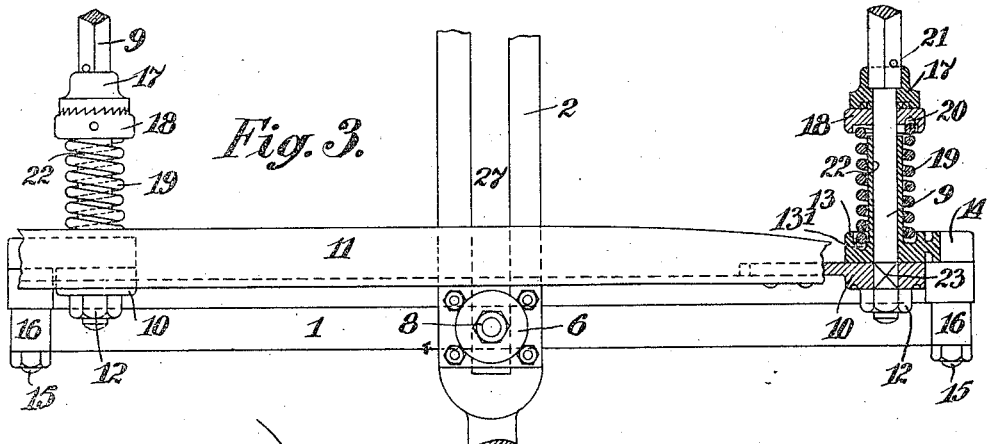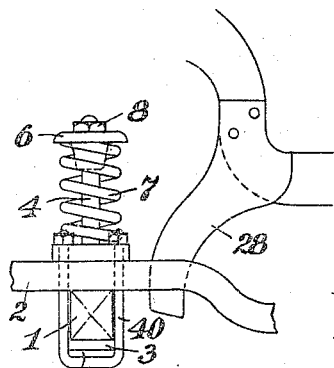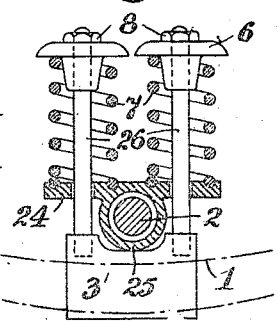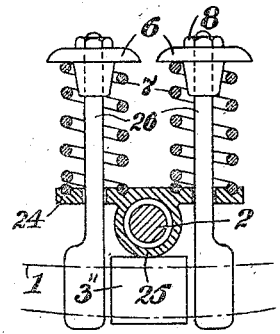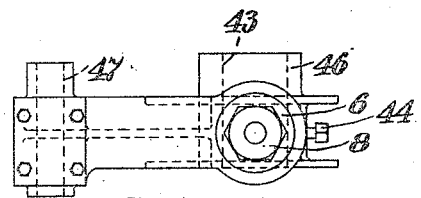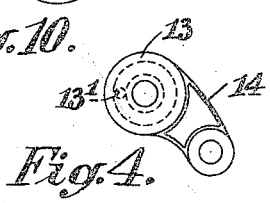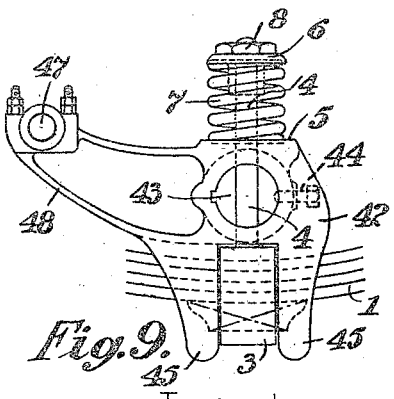

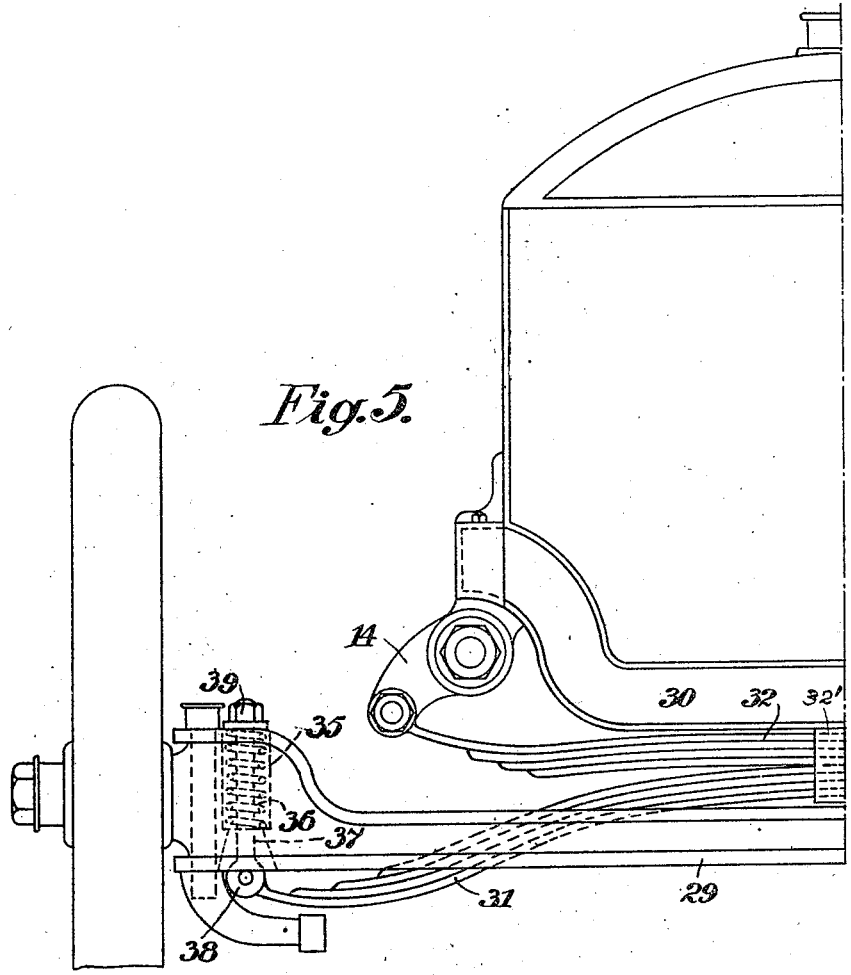

UNITED STATES PATENT OFFICE.

JOHN EDWARD ANGER, OF PRESTON, ENGLAND.

VEHICLE-SPRING.

1,031,612.  Specification of Letters Patent.  Patented July 2, 1912.

Application filed July 20, 1910. Serial No. 572,828.

*To all whom it may concern:*

Be it known that I, JOHN EDWARD ANGER, a citizen of the United States of America, residing at Preston, in the county of Lancaster and Kingdom of England, have invented certain new and useful Improvements in Vehicle-Springs, of which the following is a specification.

This invention relates to springs or spring devices for road vehicles, the object being to more effectually secure smoothness and uniformity of motion, absorb vibrations and concussions, such as are experienced when a vehicle is traveling along a road, also enable the springs to be adjusted to vary the resiliency to suit circumstances.

The invention is specially, though not exclusively, applicable to motor road vehicles.

The invention will be understood from the following description, reference being had to the accompanying drawings, in which:—

Figure 1:
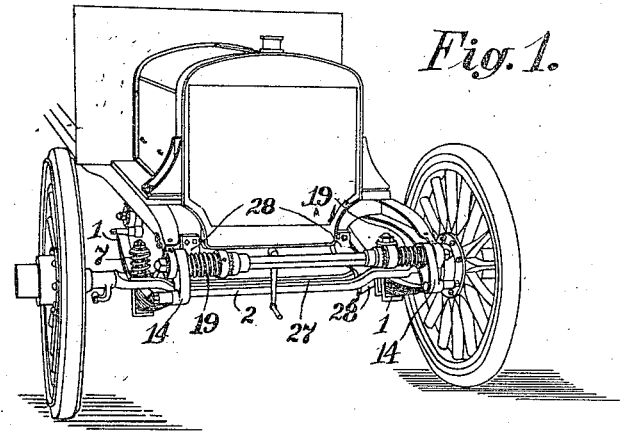
Figure 2:
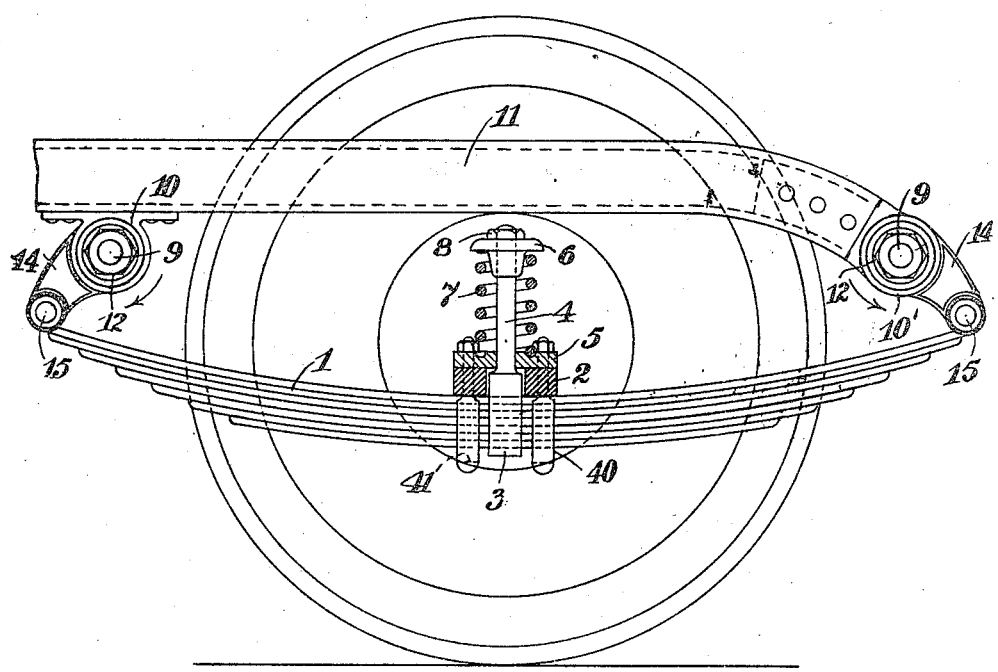

Figure 1 is a perspective view of the front of a vehicle with my invention applied thereto; Fig. 2 is a side elevation of my spring arrangement applied to a non-rotating axle of a road vehicle; Fig. 3, a plan view thereof; Fig. 4, a side view of the crank arm; Fig. 5, a front view of a motor road vehicle, showing the application of my torsion spring device when transversely arranged laminated springs are used in connection with the front axle; Fig. 6, a front view of my resilient and adjustable spring carrier and guide horn; Figs. 7 and 8, front views of my invention applied to a live axle; Fig. 9, a side view showing my invention applied to the stationary back axle, and the provision of a casting for strengthening the axle and carrying the brake band; Fig. 10, a plan view.

By the present invention, I provide the laminated spring for absorbing the greater road shocks, vertical spiral springs to absorb the lesser ones, and transverse spirals to act as spring checks, as well as shock absorbers, so that excessive reaction or bounding is checked, and last but not least, both vertical and transverse springs are adjustable for load, and for regulating the reaction of the springing system as a whole.

Referring first to Figs. 1, 2, 3, 4 and 6, 1 are the laminated springs secured to, or suspended from, the axle 2 at their center, and their leaves are bound together at the center by a strap 3. The strap 3 is provided with an upstanding rod or extension piece 4 which passes through a hole in the axle 2 and through holes in the top and bottom spring caps 5 and 6. Between these caps is placed a spiral spring 7, which can be compressed or expanded by turning a nut 8 on the top of the upper spring cap 6. The bottom spring cap 5 rests on and is secured to the axle 2. By screwing up the nut 8 on the top spring cap 6, the laminated spring 1 is drawn up against the under side of the axle 2, so as to be held against it, but in a resilient manner. A resilient and adjustable quick acting spring is thus formed which absorbs all the ordinary rapid road shocks and can be adjusted by the nut at the top, so as to give the desired flexibility. The spring 1 being carried by the spring 7, all small road shocks are absorbed at the axle, and never pass through the whole length of the laminated spring. At each end, the laminated springs are coupled by pins 15 to levers 14, around the sleeves 22 of which is wound the spiral torsion spring 19. One end of the spring is made fast to it at 13' and the other end is attached to the loose collar 18 which has teeth engaging similar teeth on a collar 17 secured to the spindle 9. These teeth are inclined like ratchet teeth in such a manner that the loose collar 18 can be revolved to pass the teeth on the fixed collar 17 in one direction only, so as to allow any desired tension to be put on the torsional spring. The crank arms 14 in their normal position lie approximately diagonal, and the weight of the vehicle is transmitted through the crank arms 14 to the laminated springs 1, also to the spiral torsion springs 19 turning the cranks in the direction of the arrows, and bending the laminated springs 1, also apply a greater or less twist to the torsion springs 19. Their torsion being opposed to the action of the laminated spring, tends to force the wheel to the ground, and supports the load, whenever the wheel drops from it by following the road. These torsional springs overcome all the unpleasantness of being thrown about by the reaction of springs when passing over bad roads, and hold the wheels to the road, thus saving wear of tires and allowing full power and effort to the engine to be transmitted through the wheels to the chassis frame. Much of the wear on back tires is caused by grinding away the rubber or studs when the wheel momentarily leaves or nearly leaves the road surface, but with the present invention, the springs really hold the wheels to the road. The spindles 9 on which the crank arms 14 are loosely mounted are secured in dumb irons or brackets 10, 10', secured to the frame 11 and made fast by nuts 12. To decrease the resiliency of the torsion springs, the collars 18 to which one end of the torsion springs 19 is attached, are turned in a direction contrary to that of the arrows by a spanner or lever, so that its inclined teeth will slide past the clutch teeth on the fixed collar 17, and so give a greater twist to the spiral spring 19. The teeth on the fixed collar acting like detents, will prevent the return of the loose collar 18, and so the spiral spring 19 is held highly twisted. This will lessen its resiliency. To increase its resiliency the fixed collar 17 is unlocked by removing the pin 21 and sliding the collar 17 on the squared part of the shaft 9, so as to release or slacken the twist of the spring 19. In this way the resilience of the torsional springs 19 is made adjustable to suit circumstances, such as variations of the load, or the degree of roughness or smoothness of the road along which the vehicle is traveling. Whether the vehicle is lightly loaded or heavily loaded, the concussions will be absorbed by the springs 1, 7 and 19, and smoothness of running obtained, so that if desired solid tires can be used instead of pneumatic ones.
I wish it to be understood that I do not confine myself to using a single spiral spring 7 in connection with each laminated spring 1. Twin springs might for example be used. If the axle 2 is a live one as shown in Figs. 7 and 8, seats 24 would be arranged on the casing or journal boxes 25 of the axle, that is one on each side of a vertical line passing through the axle. Projecting upwardly from the strap 3' (Fig. 7) and fastened thereto are a pair of rods or extensions 26, which pass through guide holes in the seats 24 and through holes in the top spring caps 6, and between the seats and caps are placed the twin spiral springs 7. In Fig. 8 the rods 26 pass around the laminated springs at their lower ends instead of being secured to the spring strap 3''. In both cases the laminated spring 1 is drawn up against the axle casing 25 and held against it by the spiral springs 7, and in both cases also the play is restricted by the holes in the seatings 24 through which the rods 26 pass, to a vertical movement. The action is the same as before, and the tension of the springs 7 is so adjusted as to just carry the load and hold the laminated spring against the casing or journal boxes 25. But, when the wheel rides over an obstruction or falls into a cavity, the spiral springs to some extent absorb the shock and vibration instead of the whole force of the shock coming upon the laminated springs.

In order to get a lateral movement of the body, plus the spring controlled up and down movement already described, and yet prevent backward movement of the axle independently of the chassis and body, I make the front axle 2 with an elongated longitudinal slot 27 in it, Figs. 1 and 3, and attach to the frame a pair of horns or extensions, one of which is shown at 28, Fig. 6, and both of which are shown in Fig. 1. These pass vertically through the elongated slot 27, in the axle, and permit lateral movement of the chassis through the horns being allowed to play in the elongated slots. The body and its chassis is centralized between the wheels by the springs 1, so that there is very little swing when traveling along a straight course, but when the car is being steered around a curve, then the springs give sufficiently to permit of this lateral movement of the horns along the slot, the chassis however being cushioned against lateral jars by the springs 1 and 7 while full freedom for vertical movement is allowed for by the down coming horns which are in a vertical plane. At the same time these horns absolutely prevent the shock of the wheels (in a fast running vehicle) when striking an obstruction, from throwing the wheel and axle, with the laminated springs and the spiral ones, momentarily backward. This throwing of the wheel backward if permitted, must wear the tread of the tires, since it is in the opposite direction to the forward movement of the wheels, and the greater the backward movement, the greater will be the slipping or wearing of the tread on the road surface. The horns or extensions 28 engaging the longitudinal slot or division in the axle, entirely prevent this backward movement, when the wheel strikes an obstruction, while at the same time permitting of lateral play, to allow of the body accommodating itself in a yieldable manner and relieving the occupants of a car from any sudden shock when turning a curve. The desirability of having a lateral cushion or play for relieving the severe shock caused by the sudden deviation from a straight course, is almost as important as having a vertical cushion or play for absorbing shocks due to inequalities in the road surface.

The laminated spring for absorbing the greater road shocks, the vertical spiral springs to absorb the lesser ones, and the transverse spirals to act as spring checks as well as shock absorbers, so that excessive reaction or bounding is checked, can equally well be applied to the front or rear axle. When however it is desired to arrange the laminated springs transversely instead of longitudinally, the arrangement shown in Fig. 5 might be used. In this 29 is the front axle, 30 the underframe of the vehicle, 31 the main laminated spring which is combined with the compensating spring 32 also laminated, and either nearly straight or of opposite curvatures. The spring 32 is fastened to the main one 31 at mid-length by the strap 32′ and its ends are coupled respectively to the crank and torsional spring arrangement 14 which latter has been already described in connection with Figs. 1, 2 and 3. The main laminated spring 31 at mid-length, is located above the axle 29, and the said axle is divided for part of its length, that is, provided with an opening at mid-width to allow for the main laminated spring 31 to pass through the axle from above, and engage with a projecting eye 38 on the under side of the axle near the axle journals on which the wheel is mounted. 35 is a pocket or cavity proceeding downwardly from the top of the axle. In this pocket 35 is placed the vertical spiral spring 36 which is seated on the bottom of the said cavity, and through the spring passes a bolt 37 having the eye 38 at the bottom end, which is coupled to the ends of the transverse laminated bearing spring 31, while at the upper end, the eye bolts 37 have a washer, or a follower and nut 39 bearing upon the top of the spiral spring 36. The nut 39 provides means for adjusting the tension of the spring 36. Hence the load is borne by the laminated springs 31 and 32, for absorbing the greater shocks, the vertical spirals 36 to absorb the lesser ones, and the transverse spirals acted on by the levers 14 to act as spring checks.

The object of hanging the spring from below the axle as described, instead of from the upper side as hitherto, is to secure a low hung car without in any way interfering with the springiness, or absorption of vibration.

Referring now to Figs. 9 and 10, 3 is the strap which binds the leaves of the spring 1 together, 4 an upstanding rod which passes through a hole in the axle, and through the casting 42, the latter having a hole 43 through which the stationary axle passes, and is fixed thereto by a key and by a set pin 44. The depending arms 45 of the casting straddle the spring 1, and between the seating 5 and the cap 6 is placed the spring 7. One object of using this casting is to prevent lateral movement of the spring 1 independently of the axle and restrict the play to the axial line of the rod 4, and hence serve a similar purpose to the arrangements described with reference to Figs. 2 and 8. Another object is to give strength to the axle 2 which might be weakened by the hole for the passage of the rod 4. On this casting is a sleeve 46 for further strengthening the axle through being weakened by the hole for the rod 4, and a lateral arm 48 which forms a support or bracket for the shaft which operates the brake band, for which purpose it is provided with journal bearings 47. The action of the springs 1 and 7 is the same as that already described with reference to Fig. 2.

I declare that what I claim is:—

1. In spring bearing devices for road vehicles, the combination of the laminated spring or springs arranged below the axle for absorbing the greater road shocks, a bolt passing upward from its center strap through the axle, vertical coiled springs seated on or in connection with the axle from which springs the bolt is suspended, transverse spirals supported inside the vehicle frame on shafts and their inner ends attached thereto, and short levers connecting the outer ends of the said transverse spirals to the ends of the laminated springs, said transverse spirals being made to act or unwind very rapidly for the purpose of causing the laminated springs to recover themselves, and keep the wheels to the road however quickly a succession of obstructions are encountered, whereby tire slip is reduced.

2. In spring bearing devices for road vehicles, the combination of a laminated spring or springs for absorbing the greater road shocks, vertical spiral spring or springs seated on or in connection with the axle to absorb the lesser ones, spindles made fast to the vehicle, cranks mounted thereon and coupled at the ends to each laminated spring, a spiral spring in connection with each crank to act as spring check to prevent excessive reaction or bounding, said spirals being placed lengthwise on the spindle and made fast at one end to the boss of the crank, while the other end is made fast to a loose collar, said collar having ratchet teeth on one face engaging corresponding teeth on the opposing face of a fixed collar in such manner that the loose collar can be revolved in one direction to tighten the spring, but be prevented from turning back.

3. In spring bearing devices for road vehicles having non-rotating axles, the combination with the laminated spring located at mid-length below the axle, of an upstanding rod projecting from its center strap and passing through the axle, a spiral spring seated on the axle through which the said rod passes, a cap and nut at the top of the rod for compressing the spiral spring and holding the laminated one up against the axle, and safety or guide links secured to the axle and passing around the laminated spring with a clearance between, substantially as described.

4. In a spring device for road vehicles, the combination of a laminated spring for absorbing the greater shocks, cranks connected to the ends of said spring, torsion springs acting on said cranks, a coil spring above the center of the laminated spring, an axle between the coil spring and the laminated spring, means carried by the coil spring for supporting the laminated spring, and means for varying the tension of said coiled spring.

5. In a spring device for road vehicles, the combination of a laminated spring for absorbing the greater shocks, cranks connected to the ends of said springs, torsion springs acting on said cranks, ratchet teeth devices for varying the torsion of said springs, a coil spring above the center of the laminated spring, an axle between the coil spring and the laminated spring and supporting the coil spring, means carried by the coil spring for supporting the laminated spring, and means for adjusting the tension of said center coil spring.

6. In a spring device for road vehicles, the combination of a laminated spring for absorbing the greater shocks, torsion springs acting upon the ends of said spring, a coil spring above the center of the laminated spring, an axle between the coil spring and the laminated spring, and supporting the coil spring, means carried by the coil spring for supporting the laminated spring, and means whereby the coil spring is put out of action and the laminated spring supported by the axle.

In witness whereof, I have hereunto signed my name this 12 day of July, 1910, in the presence of two subscribing witnesses.

JOHN EDWARD ANGER.

Witnesses:
G. C. DYMOND,
JOHN McLACHLAN.